United States Patent [19]

Thompson et al.

[11] 4,024,369

[45] May 17, 1977

[54] DUAL SIZE WIRE ARC SPRAY GUN

[75] Inventors: Henry C. Thompson, Huntington Bay; William T. Tyrrel, E. Northport, both of N.Y.

[73] Assignee: Metco, Inc., Westbury, N.Y.

[22] Filed: June 23, 1975

[21] Appl. No.: 589,723

[52] U.S. Cl. .............................................. 219/76
[51] Int. Cl.² ....................................... B23K 9/04
[58] Field of Search ..................... 219/76, 137 R

[56] References Cited

UNITED STATES PATENTS

| | | |
|---|---|---|
| 3,632,952 | 1/1972 | Rotolico et al. ............... 219/76 |
| 3,639,720 | 2/1972 | Malivoir ........................ 219/76 |

FOREIGN PATENTS OR APPLICATIONS

| | | |
|---|---|---|
| 1,357,582 | 6/1974 | United Kingdom ............. 219/76 |
| 1,397,236 | 6/1975 | United Kingdom ......... 219/137 R |

Primary Examiner—Bruce A. Reynolds
Assistant Examiner—N. D. Herkamp
Attorney, Agent, or Firm—S. A. Giarratana; F. L. Masselle

[57] ABSTRACT

An arc spray gun in which the ends of two metal wires, respectively connected to opposite terminals of a DC power source, are fed to an intersection point to strike and maintain an electric arc, melting the wires. A gas jet directed at the intersection point sprays the molten metal onto the object to be coated. The wire connected to the positive terminal of the power source is of larger diameter than the negative-terminal-connected wire. Parallel guides are provided for feeding the wires through hollow electrodes converging toward the arc-melting zone, the guide path of the larger wire being straighter than that of the smaller wire.

8 Claims, 1 Drawing Figure

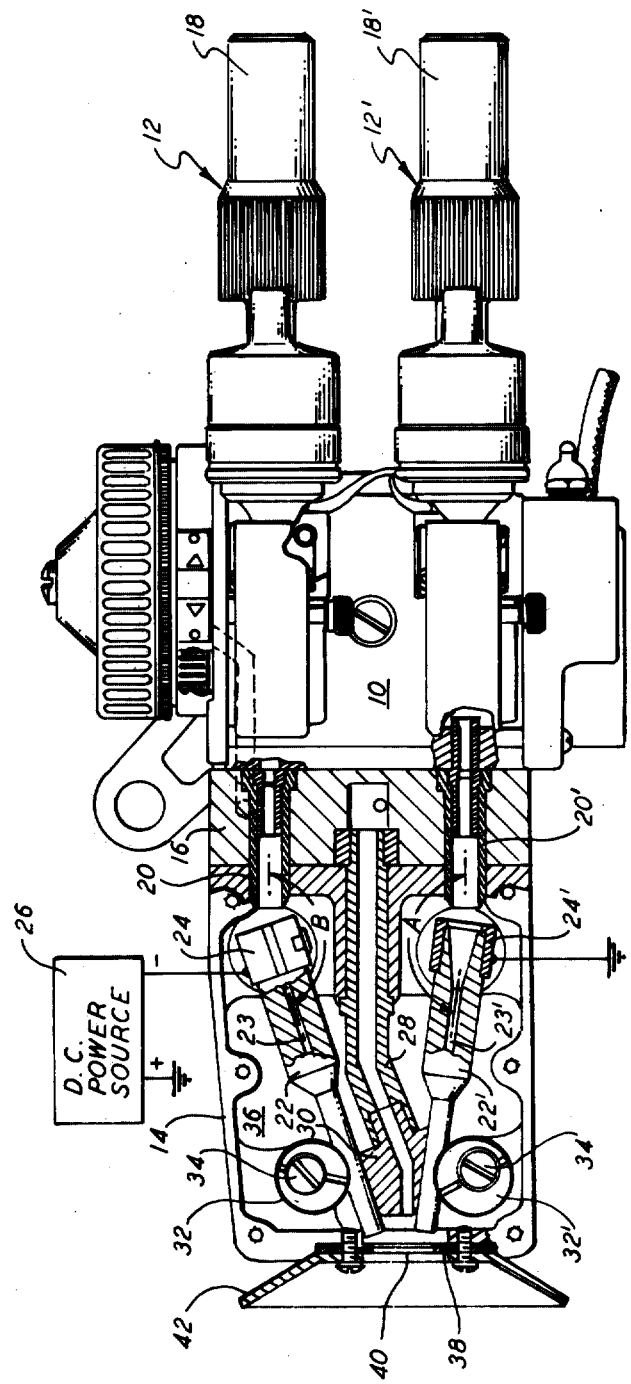

DUAL SIZE WIRE ARC SPRAY GUN

BACKGROUND

1. Field of the Invention

This invention relates to arc spray guns of the type in which the ends of two metal wires are melted in an electric arc and the resulting molten metal sprayed on a workpiece to be coated. The invention relates more particularly to arc spray guns adapted for utilization with two metal wires of different cross-sectional area and of relatively hard metals.

2. Prior Art

In arc spray guns, two metal wires are connected to respective terminals of an electrical power source and the ends brought together to form an electric arc which causes melting of the wires. A jet of air or other gas applied from a nozzle in proximity to the zone of melting, sprays the molten metal thus produced on a workpiece to be coated. The wires are advanced into the melting zone to maintain the arc and replace wire previously melted and sprayed.

While arc spray guns can operate on either AC or DC, the latter is much preferred as it results in a much quieter and more stable arc. Unfortunately, DC operation also has an attedant disadvantage: the positive electrode is heated more than the negative electrode by the electric arc; consequently, the positive wire is consumed at a higher rate and, assuming the wires are fed at the same rate, the arc becomes asymmetrical with respect to the gas jet which sprays the molten metal. To cope with this problem, it has been proposed in British Pat. Specification No. 1,357,582 that the positive wire be advanced at a rate sufficiently higher than the negative wire to compensate for the difference in the rate of consumption. The same patent specification alternatively proposes the use of wires of dissimilar cross-section, the positive wire being the larger, of course. The U.K. Specification states that the use of wires of different diameters would be "operationally disadvantageous" but is has been discovered that the problems attendant to the utilization of dual wire sizes in an arc spray gun are, in fact, susceptible of solution so as to enable the utilization of this concept in a spray gun of simple, practical, and efficient design.

One of the major problems encountered in employing dual wire sizes in a spray gun is the difference in the flexibility of the wires stemming from the differences in cross-section. This problem, though encountered when spraying soft metals such as aluminum and zinc, becomes particularly acute when handling less malleable metals such as steel.

In conventional arc spray guns, the wires are guided to the arc location by threading them through a pair of parallel guide members and then through a pair of tubular electodes converging toward the melting zone. The electrodes are connected to respective terminals of the power source and electrical contact to the wires results from the fact that the wires must bend when passing from the parallel guide members to the converging electrodes, this bending action being accomplished and accompanied by rubbing contact between the inner walls of the electrodes and the wires passing therethrough. If dual wire sizes are introduced into conventional spray guns, particularly wires of steel or other low malleability metals, the thicker and therefore, more rigid wire resists the necessary bending as it enters the electrode causing feeding difficulties which may take the form of either or both jamming of the gun and slippage of the wire feeding mechanism. Even in marginal situations where it is possible to achieve operation, the thicker wire imposes undue strains and wear on the feeding and guiding mechanisms of the gun.

SUMMARY OF THE INVENTION

For alleviation of this problem, the present invention contemplates an arc spray gun for melting the ends of two electrically isolated metal wires of different diameter in an electric arc struck between their ends and spraying molten metal in which the feed path configuration for the heavier wire is different from that of the smaller diameter wire.

More specifically, the invention contemplates an arc spray gun comprising a pair of tubular wire guide members each having an inlet and an outlet end and adapted to have a metal wire threaded therethrough and a pair of tubular electrodes each connected to a respective terminal of a DC power source. Each electrode has an inlet end and an outlet end, the inlet ends of the electrodes being respectively adjacent to the outlet ends of the guide members thus to receive wire issuing from the guide members. The electrodes are disposed with respective axes converging toward their outlet ends whereby wire passing through the electrodes is conducted toward a melting zone to strike and maintain an electric arc. The axes of the wire guide members make different obtuse angles with the respective axes of the electrode members, the angle being greater in the case of the electrode member connected to the positive terminal of the power source.

BRIEF DESCRIPTION OF THE DRAWINGS

The single FIGURE of drawing is a top view, partially in horizontal section, of a spray gun embodying the present invention.

The spray gun illustrated in the drawing is of the same general construction and operation as that described in detail in U.S. Pat. No. 3,632,952. Consequently, the structure of the gun will be described only to the extent that it is material and relevant to the present invention. For ease of description, the end of the gun on which the molten metal is sprayed will be considered the front end and the directional references forward and rearward will be based on this convention.

Referring then to the drawing, the major operative components of the gun are enclosed in a housing having three main sections: a drive housing block 10 containing the mechanism for feeding wire through the gun; wire intake assemblies 12, 12' mounted to the rear of the drive mechanism block; and an electrode and nozzle assembly housing portion 14 secured to the front of the drive mechanism housing by an intermediate housing block member 16. The wire intake assemblies 12, 12' include sleeves 18, 18' enclosing substantially identical wire inlet guides, not shown, by means of which wire from a coil or other suitable source, is introduced into the gun and more specifically into drive housing block 10 which contains conventional mechanism for drawing the wire into the gun and advancing it through nozzle assembly 14 to the melting zone as will be described presently.

The mechanism for advancing the wire includes a pair of opposed feed rolls for each wire, geared together and coupled to a common drive shaft driven by a suitable source of motive power such as an electric motor or gas turbine, all in the manner described and shown in the aforementioned U.S. Pat. No. 3,632,952. In a gun utilizing dual wire sizes in accordance with the present invention, the configuration of, and spacing between pairs of the feed rolls is such as to accommodate the difference in wire diameters.

Extending from the drive mechanism block 10 through intermediate block 16 and into nozzle assembly housing 14 are a pair of tubular wire guide members 20, 20' mounted with their longitudinal axes parallel and coincident with the axes of the intake wire guides. Thus, it will be seen that wires drawn through the intake wire guides may pass directly into the rearward (inlet) ends of wire guide members 20, 20' and issue from the forward (outlet) ends.

Within the nozzle and electrode housing portion 1 are a pair of elongated hollow electrode members 22, 22' mounted with their longitudinal axes converging toward the forward end of the housing. Electrode members 22, 22' have respective axial bores 23, 23' accommodating passage of the wires fed to the arc. The divergent rearward ends of electrode members 22, 22' terminate in proximity to respective forward ends of wire guide members 20, 20' and in a position to receive the wire issuing therefrom, being held in such position by means of suitable electrode clamps 24, 24'. The electrode clamps, in an actual commercial construction, include an arrangement for connecting each clamp and, consequently, each electrode to a respective terminal of a suitable DC power source. Inasmuch as the details of the electrical connection are fully illustrated and described in the aforementioned U.S. Pat. No. 3,632,952, in the interest of simplicity and brevity, the electrical connections are shown symbolically in the present case. Thus, electrode clamp 24 is connected to the negative terminal of a DC source 26, the positive terminal of which is connected to ground and, through ground, to the other electrode clamp 24'.

Mounted between and in the same horizontal plane as electrodes 22, 22' is an air tube 28 in communication at its rearward end with air supply passages in intermediate block 16 and terminating at its front end in an air jet nozzle 30. Air jet nozzle 30 has its side surfaces tapered to conform to the angle of convergence of electrode members 22, 22' and such side surfaces are hemicylindrically formed to provide seats for the forward ends of these electrode members. The electrode members are removably maintained seated in the hemicylindrical recesses by means of eccentric cams 32, 32' which rotate about cam screws 34, 34'.

Nozzle housing portion 14 defines a chamber 36 which surrounds electrode members 22, 22' and air jet assembly 28, 30 and terminates at its forward end in a cap 38 having a spray opening 40 therein. A spray shield 42 is mounted at the front of housing portion 14 and surrounds spray opening 40.

The axis of each electrode member 22, 22' makes an obtuse angle A, B with the respective axis of the wire guide member 20, 20' associated therewith. In contrast to conventional spray gun constructions, angles A and B are not equal, the angle (A) being larger in the case of the electrode (22') connected to the positive terminal of power source 26. As previously explained, in a DC operated arc spray gun, the wire in the positive electrode is more rapidly consumed. To compensate, in the spray gun contemplated by the present invention, a positive wire having a larger dimension than the negative wire is employed. In a typical case, the cross-sectional area of the positive wire would be double that of the negative wire.

Accordingly, the bore 23 of electrode member 22 which accommodates the passage of the smaller wire is correspondingly smaller than the bore 23' of the larger wire electrode member 22'. Both wires normally are from 1/32" to 3/16" in diameter and cross-sectional area ratios contemplated by the invention range from 1.2 to 3.8, with a preferred range of 1.5 to 2.2.

The bores of wire guide members 20, 20' may be of equal diameter and large enough to accommodate the larger wire or each may have a diameter specifically selected to accommodate the size of the wire it conducts.

As the larger obtuse angle between the positive electrode and the associated wire guide member provides a straighter path, it is possible to accommodate the larger diameter without the difficulties which would normally ensue, particularly where handling wire of steel or other metals of relatively lower malleability. The precise magnitudes of the obtuse angles A and B depend, of course, on such parameters as absolute and relative wire sizes, the identity and physical characteristics of the wire metal, etc. The large wire angle A may range from straight angle, 180°, to 165° with a preferred range of 172° to 178°. The use of a straight angle would create the need for some special provision to insure electrical contact between the wire and the inner wall of bore 23'. The magnitude of angle B depends on, and varies inversely with respect to, the size of angle A in a given construction; preferably, angle B would range from 145° to 155°.

To accommodate the asymmetry in the electrode angles, air tube 28 has its forward end angulated so as to position the nozzle properly with respect to the arc and melting zone.

What is claimed is:

1. An arc supply spray gun for melting the ends of two electrically isolated metal wires in an electric arc struck between their ends and spraying molten metal, comprising:
   a pair of tubular wire guide members each having an entrance end and an exit end and adapted to have a metal wire threaded therethrough;
   a pair of generally tubular electrode members each connected to a respective terminal of a DC power source and each having an entrance and an exit end, the entrance end of each electrode member being adjacent the exit end of a respective one of said guide members and oriented to receive wire issuing from said one guide member, said electrode members being disposed with their respective longitudinal axes convering in the direction of their exit ends toward an intersection point remote from said electrode member exit ends, whereby wire passing through the electrode members are conducted toward said intersection point to strike and maintain an electric arc, the axes of the electrode members making different obtuse included angles with the respective axes of the wire members, the angle being greater in the case of the electrode member connected to the positive terminal of the power source; and
   nozzle means positioned to direct a jet of gas toward said intersection point to spray molten metal generated by the arc.

2. An arc spray gun according to claim 1 wherein the obtuse angle of the positive-connected electrode member is in the range of 165° to 180° and the other obtuse angle in the range 155° to 145°.

3. An arc spray gun according to claim 2 wherein the internal diameters of said guide members and electrode members are such as to accommodate passage of wire sizes ranging from 1/32 to 3/16 inch in diameter and the interior cross-sectional areas of at least the electrode members are dissimilar, the area of the positive-connected electrode member being larger and the area ratio being in the range 1.2 to 2.8.

4. An arc spray gun according to claim 3 wherein said cross-sectional area ratio is in the range 1.5 to 2.2.

5. An arc spray gun for melting the ends of two electrically isolated metal wires in an electric arc struck between their ends and spraying molten metal, comprising:

a pair of tubular wire guide members, disposed in substantially parallel relationship one with respect to the other, having an entrance end and an exit end and being adapted to have a metal wire threaded therethrough;

a pair of generally tubular electrode members each connected to a respective terminal of a DC power source, the internal diameter of the electrode member connected to the positive terminal being larger than that of the negative-terminal-connected electrode member, each of said electrode members having an entrance end and an exit end, the entrance end of each electrode member being adjusted the exit end of a respective one of said guide members and oriented to receive wire issuing from said guide member, said electrode members being disposed with their respective longitudinal axes converging in the direction of their exit ends toward an intersection point remote from said electrode member exit ends, whereby wire passing through the electrode members are conducted toward said intersection point to strike and maintain an electric arc, the axes of the electrode members making different obtuse included angles with the respective axes of the wire guide members, the angle being substantially greater in the case of the electrode member connected to the positive terminal of the power source; and nozzle means positioned to direct a jet of gas toward said intersection point to spray molten metal generated by the arc, said nozzle means including an air jet nozzle having side surfaces tapered and arranged to provide seats for aligning the exit ends of the electrode members, the side surfaces being disposed at different obtuse included angles with the respective axes of the wire guide members, the angle being substantially greater in the case of the side surface for seating the electrode member connected to the positive terminal of the power source, and means for urging the electrode members to engage said side surfaces, respectively; an air tube for supplying air to said air jet nozzle, the end of said air tube adjacent said air jet nozzle being angulated so as to direct the jet of air toward said intersection point.

6. An arc spray gun according to claim 5 wherein the bores of said tubular wire guide members are substantially equal.

7. An arc spray gun according to claim 5 wherein the bores of said tubular wire guide members have diameters preselected to accomodate the size of the wire passing therethrough.

8. An arc spray gun according to claim 5 wherein the cross-sectional area ratio of the electrode members is in the range of from about 1.5 to about 2.2, and wherein the obtuse angle of the positive-connected electrode member is in a range of from about 165° to about 180° and the other obtuse angle is in the range from about 155° to about 145°.

* * * * *